US009436627B2

(12) United States Patent
Shiratori

(10) Patent No.: US 9,436,627 B2
(45) Date of Patent: Sep. 6, 2016

(54) DETECTION OF ABNORMAL OPERATION CAUSED BY INTERRUPT PROCESSING

(75) Inventor: Toshiyuki Shiratori, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 14/239,832

(22) PCT Filed: Jul. 25, 2012

(86) PCT No.: PCT/JP2012/068896
§ 371 (c)(1),
(2), (4) Date: Feb. 20, 2014

(87) PCT Pub. No.: WO2013/027529
PCT Pub. Date: Feb. 28, 2013

(65) Prior Publication Data
US 2014/0181344 A1 Jun. 26, 2014

(30) Foreign Application Priority Data

Aug. 25, 2011 (JP) .................................. 2011-183312

(51) Int. Cl.
G06F 13/24 (2006.01)
G06F 13/26 (2006.01)
G06F 11/07 (2006.01)
(52) U.S. Cl.
CPC ........... *G06F 13/26* (2013.01); *G06F 11/0706* (2013.01); *G06F 11/0751* (2013.01); *G06F 11/0757* (2013.01)
(58) Field of Classification Search
CPC ........... G06F 11/0757; G06F 11/0751; G06F 11/0706; G06F 13/26
USPC ........................................................ 710/260
See application file for complete search history.

(56) References Cited

U.S. PATENT DOCUMENTS 5,408,643 A 4/1995 Katayose

FOREIGN PATENT DOCUMENTS

CN 1815449 A 8/2006
JP 62175840 A 8/1987
(Continued)

OTHER PUBLICATIONS

International Application No. PCT/JP2012/068896, Written Opinion of the International Searching Authority, dated Sep. 11, 2012, 4 pages.

(Continued)

Primary Examiner — Chun-Kuan Lee
(74) Attorney, Agent, or Firm — Stosch Sabo; Randall J. Bluestone

(57) ABSTRACT

A controller for controlling interrupt processing in a multiple-interrupt system is provided. The controller includes multiple watchdog timers (WDTs), each provided for each of interrupt priorities. The controller includes interrupt priority selectors, each of which receives each interrupt request signal and outputs an activation signal to a corresponding WDT according to the priority of the interrupt request signal. The controller includes an interrupt processing circuit, which when a WDT has timed out, outputs, to a processor, an interrupt request signal having a priority one or more levels higher than the priority corresponding to the WDT. When multiple causes of interrupt are assigned to one of the interrupt priorities, the interrupt processing circuit gives priority to an interrupt request signal caused by the timeout of a WDT lower in priority level than the interrupt priority to detect that an abnormal operation has occurred in interrupt processing having the lower level priority.

20 Claims, 2 Drawing Sheets

(56) References Cited

FOREIGN PATENT DOCUMENTS

| | | |
|---|---|---|
| JP | 63308646 | 12/1988 |
| JP | 04155543 | 5/1992 |
| JP | 10275097 A | 10/1998 |
| JP | 11161523 | 6/1999 |
| JP | 11237995 | 8/1999 |
| JP | 2002351700 A | 12/2002 |
| JP | 2010009258 | 1/2010 |
| JP | 2011258032 A | 12/2011 |
| JP | 532720 B2 | 10/2013 |
| WO | WO2013/027529 A1 | 2/2013 |

OTHER PUBLICATIONS

International Application No. PCT/JP2012/068896, International Search Report, dated Aug. 30, 2012, 2pages.
Examination Report under Section 18(3) dated Mar. 24, 2014, International Application No. GB1402735.3, 4 pages.
Response to the Examination Report under Section 18(3) dated Mar. 24, 2014, International Application No. GB1402735.3, 1 page.
Written Opinion of the International Searching Authority, International Application No. PCT/JP2012/068896, PCT/ISA/237, Sep. 11, 2012, 4 pages. (Translated).

DETECTION OF ABNORMAL OPERATION CAUSED BY INTERRUPT PROCESSING

BACKGROUND

The present invention relates to a multiple-interrupt system, and more particularly to the detection of an abnormal operation caused by interrupt processing in a multiple-interrupt system.

In order to guarantee realtimeness in an embedded system or the like, there is a system configured such that, when there is an interrupt request higher in priority than the priority (level) of interrupt being processed, the interrupt being processed is suspended and the higher-priority interrupt is processed, and after completion of the interrupt processing, the suspended interrupt processing is resumed. The system is a so-called multiple-interrupt system or a system for nesting interrupts according to priority.

There is also a system equipped with a watchdog timer (hereinafter referred to as "WDT") as hardware for monitoring that the system is operating regardless of whether the system is a multiple-interrupt system.

In an embedded system or the like, the system may not operate normally despite the fact that the WDT has not timed out (expired). There are various causes of abnormal operations, and there are also many abnormal operations associated with interrupt processing. In the case of a multiple-interrupt system, automatic recovery and cause analysis are often made difficult.

An example of the insufficient detection of an abnormal operation is a case where the WDT is reset by a timer interrupt (or by all interrupts) (because there is one WDT in normal systems). In this case, the WDT can only confirm that the CPU (and surrounding H/W) is operating. In other words, the WDT confirms that a peripheral circuit issues an interrupt request and the CPU accepts the request. In this regard, it is not confirmed whether an operation expected by the system is being performed or not.

Japanese Patent Application Publication No. 62-175840 discloses a data processing system for executing multiple processing programs according to the levels in the intervals of execution of a processing program having the highest level (highest execution priority level). In this system, multiple WDTs having overflow values different according to the levels of the processing programs and reset after completion of the execution of corresponding processing programs are provided to detect the occurrence of a failure in the data processing system based on the overflow of any one WDT.

Japanese Patent Application Publication No. 10-275097 discloses a data processing system for executing multiple processing programs in order of priority according to the levels. In this system, multiple WDTs individually corresponding to the respective multiple processing programs are arranged to detect the occurrence of a hang-up of the data processing system based on the overflows of these multiple WDTs.

The data processing system in Japanese Patent Publication No. 62-175840 assumes the execution of the highest-level processing program started by the timer, and does not support interrupt processing between levels lower than the highest level or interrupt processing when multiple programs are assigned to one level. Further, there is no disclosure about the timings of starting the WDTs.

In the data processing system in Japanese Patent Publication No. 10-275097, since the multiple WDTs are not started in parallel, the multiple interrupts different in priority cannot be processed (managed) in parallel.

SUMMARY

It is an object of the present invention to enable multiple-interrupt processing capable of detecting an abnormal operation caused by one of interrupt processing when multiple interrupts different in priority occur in parallel or when multiple interrupts occur in parallel in one level (priority).

In one illustrative embodiment a method of detecting an abnormal operation caused by interrupt processing in a multiple-interrupt system is provided. The method includes: preparing a WDT having a predetermined time-out value for each interrupt priority; starting each WDT at the time of an interrupt request having the corresponding priority is asserted; and when at least one of the WDTs has timed out, accepting an interrupt request having a priority at least one or more levels higher than the priority corresponding to the WDT, wherein when multiple causes of interrupt are assigned to one of the interrupt priorities in the step of accepting the interrupt request, priority is given to the interrupt request caused by the timeout of a WDT having a level lower than the interrupt priority to detect that an abnormal operation has occurred in interrupt processing having the lower level priority.

In another illustrative embodiment, there is provided a controller for controlling interrupt processing in a multiple-interrupt system. The controller includes: multiple WDTs each having a predetermined time-out value provided for each interrupt priority; an interrupt priority selector for receiving interrupt request signals from devices and outputting an activation signal to the corresponding WDT according to the priority of each interrupt request signal; and an interrupt processing circuit which, when at least one of the WDTs has timed out, outputs, to a processor, an interrupt request signal having apriority at least one or more levels higher than the priorities corresponding to the WDTs. The controller is farther configured such that, when multiple causes of interrupts are assigned to one of the interrupt priorities, the interrupt processing circuit gives priority to an interrupt request signal caused by the timeout of a WDT lower in priority level than the interrupt priority to detect that an abnormal operation has occurred in interrupt processing having the lower level priority.

According to the illustrative embodiments and one aspect thereof, when multiple interrupts whose interrupt priorities are the same as or different from each other have occurred, it can be detected in which priority an abnormality has occurred in interrupt processing. Further, since priority is given to an interrupt request caused by the timeout of a WDT lower in priority level than the other interrupt causes in the same priority, i.e., since the abnormality of interrupt processing is detected at the time of starting the interrupt processing (when the interrupt processing of the lower priority is proved not to be started), the accuracy (precision) of abnormality detection can be more improved than detection upon timeout of a conventional WDT.

DETAILED DESCRIPTION

Figure 1:
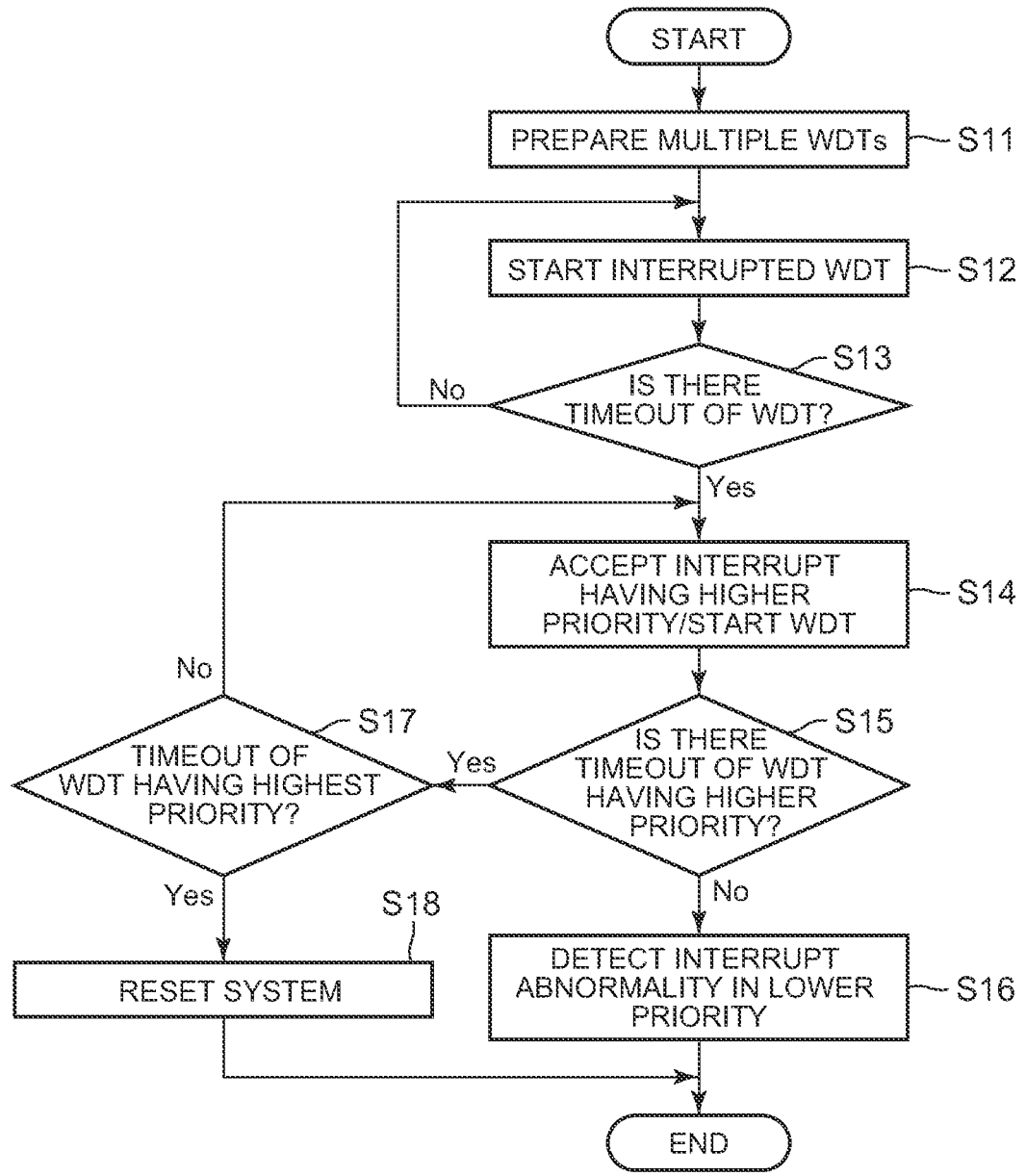
FIG. 1 is a diagram for describing a flow of a method of detecting an abnormal operation caused by interrupt processing of the present invention.

Illustrative embodiments of the present invention will be described with reference to the accompanying drawings. FIG. 1 is a diagram for describing a flow of a method of detecting an abnormal operation caused by interrupt processing in a multiple-interrupt system. This method can be implemented basically in hardware by taking, as an example, a controller for controlling interrupt processing of the illustrative embodiments in a manner to be described later. However, it goes without saying that this method is not to eliminate implementation in a program (software) and the method may be implemented in both in cooperation with each other.

In step S11, multiple WDTs are prepared. Each WDT is configured to have a predetermined time-out value for each interrupt priority (level). The predetermined time-out value is set according to the priority and the cause of interrupt. Here, the cause of interrupt means the content to be processed by the CPU such as a program to be processed or each of various inputs and outputs through an I/O. In general, the time-out value is set shorter as the interrupt priority increases.

In step S12, a WDT having a priority for which an interrupt request is made is started at the time of receiving the interrupt request. At this time, when multiple causes of interrupt are assigned to one of interrupt priorities, a corresponding WDT is started when a first interrupt request is made among the causes of interrupt. The started WDT is reset at the time of accepting an interrupt having the priority, i.e., at the time when the interrupt processing is started by a processor after a corresponding interrupt request is accepted (at the time of starting execution of an interrupt handler).

In step S13, it is determined whether at least one WDT has timed out (expired). Specifically, it is determined whether the count value of the WDT becomes greater than or equal to the predetermined time-out value (whether the WDT is overflown). When this determination is No, since the interrupt request is being processed without a hitch, the procedure returns before moving to step S12 to wait for the next interrupt request.

When the determination in step S13 is Yes, an interrupt request having a priority at least one or more levels higher (upper) than the priority of the WDT that has timed out is accepted in the next step S14. Simultaneously, the upper WDT is started. At this time, the priority to be selected is not limited to that one level higher than the priority of the WDT that has timed out, and it may be a priority two levels higher or more. Further, the number of priorities to be selected is not limited to one, and two or more priorities may be selected. In other words, in step S14 in which the interrupt request is accepted, interrupt requests with two or more priorities at least one or more levels higher than the priority corresponding to the WDT can be accepted.

In step S14, when multiple causes of interrupt are assigned to one of interrupt priorities, priority is given to an interrupt request caused by the timeout of a WDT having a priority level lower than the interrupt priority. For example, even when the number of causes of interrupt having priority level N is two or more, if there is a timeout of a WDT having priority level (N−1), one level lower than the priority level N, priority is given to the interrupt request having the priority level (N−1) (which is deemed as if it were a new N level), and made to interrupt the processing. The reason for employing this mechanism is to detect, in step S16 to be described later, that an abnormal operation has occurred in the interrupt processing having the lower priority level ((N−1) level in the above example).

In step S15, it is determined whether the WDT having the priority selected in step S14 as being at least one level higher has timed out (expired). Like in the case of step S13, the specific determination is made by determining whether the count value of the WDT becomes greater than or equal to the predetermined time-out value (whether the WDT is overflown).

When the determination in step S15 is No, i.e., when the interrupt processing is going well after the interrupt request having the priority selected in step S14 as being at least one level higher is accepted, the abnormality of an interrupt in lower priority is defected in step S16. Specifically, as described in step S14 mentioned above, when an interrupt request caused by the timeout of a lower-level WDT is adopted, it is detected that an abnormality has occurred in the interrupt processing of the timeout priority. Thus, in the illustrative embodiment, priority is given to an interrupt request caused by the timeout of a WDT having a lower level priority, i.e., the abnormality of the interrupt processing is detected at the time of starting the interrupt processing (when the interrupt processing of the lower priority is proved not to be started). Therefore, as will become apparent from each example to be described later, the accuracy (precision) of abnormality detection can be more improved than detection upon timeout of a conventional WDT.

When the determination in step S15 is Yes, it is determined in step S17 whether a WDT corresponding to an interrupt whose priority is highest has timed out (expired). Like in the case of step S13, the specific determination is made by determining whether the count value of the WDT becomes greater than or equal to the predetermined time-out value (whether the WDT is overflown). When this determination is No, the procedure returns to step S14 to accept an interrupt request having a priority at least one or more levels higher (upper) than the priority of the WDT that timed out in step S15. Simultaneously, the upper WDT is started.

When the determination in step S17 is Yes, the system is reset in step S18. As a result of the resetting of the system, the abnormality of the interrupt processing is detected.

Figure 2:
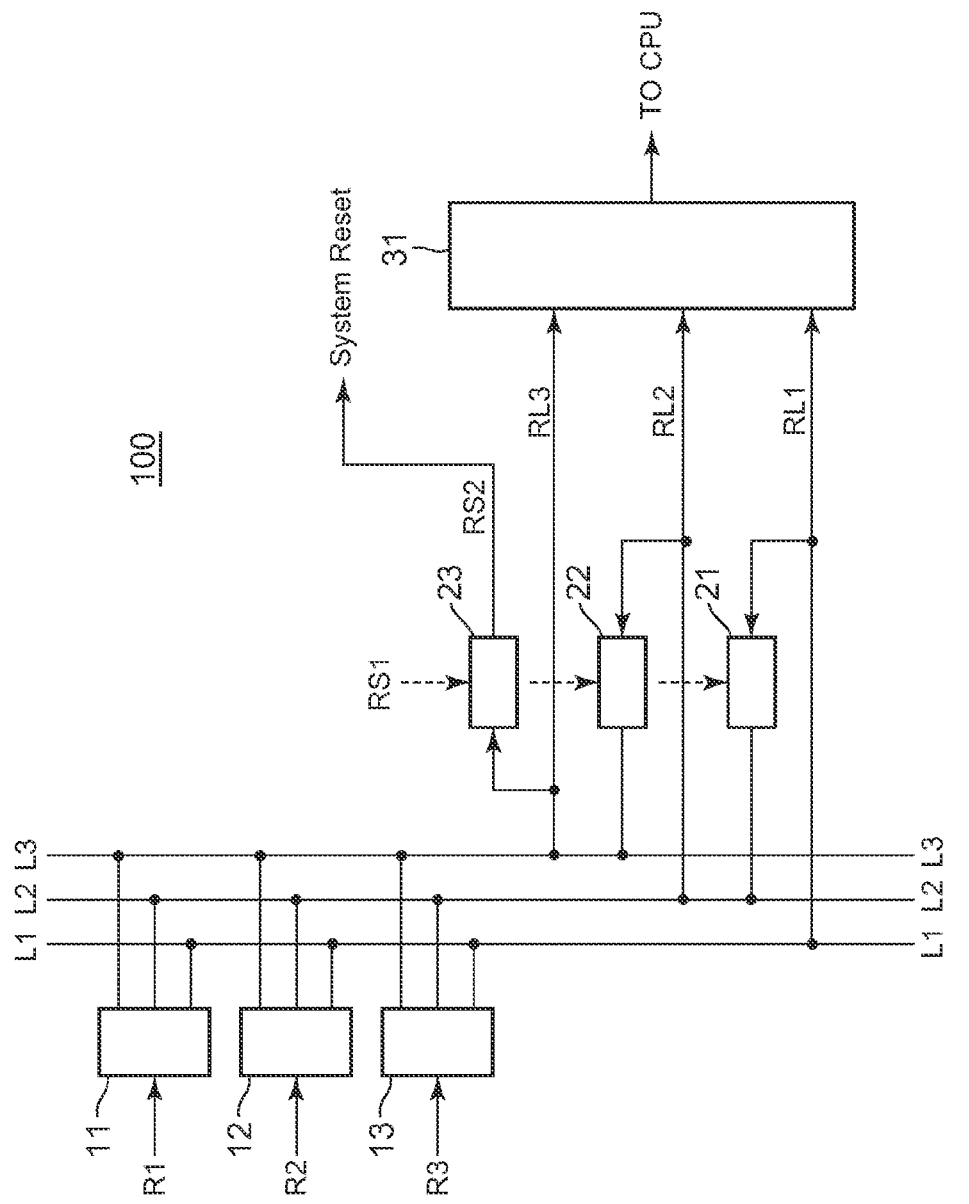
FIG. 2 is a diagram showing the configuration of a controller for controlling interrupt processing of the present invention.

Referring next to FIG. 2, a controller for controlling interrupt processing of an illustrative embodiment will be described. FIG. 2 is a diagram showing the configuration of a controller 100 as one embodiment. The controller 100 is configured as part of a multiple-interrupt system or an external controller. In FIG. 2, a configuration with three interrupt priorities (levels L1, L2, and L3) is shown as an example, but this is just an example. When the number of arbitrary-priorities is four or more, the number of respective components to be described below can be increased to expand, the configuration.

In FIG. 2, the controller 100 includes priority selectors 11, 12, and 13, priority lines L1, L2, and L3, WDTs 21, 22, and 23, and an interrupt processing circuit 31. The output of the priority selectors 11, 12, and 13 is connected to the priority lines L1, L2, and L3, respectively. The priority selectors 11, 12, and 13 receive interrupt request signals R1, R2, and R3 from respective devices (not shown), and outputs respective request signals to the corresponding priority lines L1, L2, and L3 according to the priority of each interrupt request signal. To be more specific, the priority selectors 11, 12, and 13 distribute each request signal to a preset priority according to the cause of interrupt contained in each of the interrupt request signals R1, R2, and R3. This request signal also serves as an activation signal for each of the WDTs 21, 22, and 23. Note that the number of priority selectors is not limited to three, and it can be any number greater than or equal to two.

The WDT 21 is a WDT corresponding to priority L1, and the input thereof is connected to the priority line L1 with the output connected to the priority line L2. The WDT 21 has a predetermined time-out value T1. As already described in step S11 of FIG. 1, the predetermined time-out value is set according to the priority and the cause of interrupt. Similarly, the WDTs 22 and 23 are WDTs corresponding to priorities L2 and L3, respectively, and the input thereof are connected to the priority lines L2 and L3, respectively. The output of the WDT 22 is connected to the priority line L3. The output of the WDT 23 is output as a signal for resetting the system in a manner to be described later. The WDTs 22 and 23 have predetermined time-out values T2 and T3, respectively. In the example of FIG. 2, Since the priorities increase as L1<L2<L3, the time-out values become smaller inversely as T1>T2>T3. Each WDT is reset by a reset signal RS1 from the CPLT or a separate reset circuit (not shown) when a corresponding interrupt request is sent to the CPU and the interrupt processing is started.

Among the WDTs, when a WDT having the highest interrupt priority has timed out itself, a signal for resetting the system is output toward a reset circuit incorporated in the central processing unit (CPU) or an external reset circuit (not shown). In the example of FIG. 2, when the highest-level WDT 23 has timed out, a system reset signal RS2 is output. As a result of resetting the system, the abnormality of the interrupt processing is detected.

The interrupt processing circuit 31 receives interrupt request signals RL1, RL2, and RL3 distributed by priority from the priority lines L1, L2, and L3, and selectively sends an interrupt request signal toward the CPU. Here, selectively sending means suppressing the output of any other interrupt request signal having a priority level less than or equal to a corresponding priority upon outputting the interrupt request signal. For example, when an interrupt request signal having priority level (N−1) is output, the output of other interrupt request signals having priorities less than or equal to priority level (N−1) is suppressed except the interrupt request signals greater than or equal to the higher priority level N.

When at least one WDT has timed out, the interrupt processing circuit 31 outputs, to a processor, an interrupt request signal having a priority at least one or more levels higher than the priority corresponding to the WDT. For example, when the WDT 21 has timed out in FIG. 2, the request signal RL2 from the priority line L2 one level higher than the priority is selectively sent toward the CPU. At this time, in addition to the request signal RL2 having priority L2, the request signal RL3 having priority L3 two levels higher than the priority may be selected and sent. Further, two request signals RL2 and RL3 may also be selected and sent sequentially.

When multiple causes of interrupt are assigned to one of the interrupt priorities, the interrupt processing circuit 31 is configured to give priority to an interrupt request signal caused by the timeout of a WDT having a level lower than the interrupt priority. For example, even when there are multiple causes of interrupt having priority level L2 (e.g., R1 and R3) in FIG. 2, if there is a timeout of the WDT 21 having priority level L1 one level lower than level L2, priority is given to the interrupt request RL1 having the priority level L1 (which is deemed as if it were an L2-level request RL2), and made to interrupt the processing. The reason for employing this mechanism is to detect that an abnormal operation has occurred in interrupt processing having the lower priority level (level L1 in the above example).

Next, a method of the present invention and examples of abnormality detection of interrupt processing made by the controller will be described below as examples.

Example 1

When an interrupt request having priority level N continues because the interrupt processing having priority level N is incorrect and hence the cause of interrupt is not cleared (abnormal operation).

The interrupt request having priority level (N−1) cannot be accepted indefinitely. Therefore, the WDT having priority level (N−1) times out to make an interrupt request having higher priority level N. This interrupt request having priority level N is accepted. At this time, since the interrupt processing corresponding to a WDT having the lower priority level that timed out is given the highest priority with respect to the multiple causes of the interrupt (including the interrupt request for an abnormal operation) as already mentioned, above, the abnormality of the interrupt processing is defected. Even if the determination of the priority level is incorrect, interrupt processing will be processed in the same manner as in (1) of Example 2 to be mentioned later to detect the abnormality.

When an interrupt request having a priority level of (N−2) or less is the beginning, since the WTJTs having respective priority levels time out so that WDTs having higher priority levels will be started and time out sequentially, an abnormality is detected in the same manner as in (1) mentioned above (the same shall apply in the following examples).

Example 2

When interrupt processing having priority level N is trapped in an endless loop (abnormal operation).

The interrupt request having priority level (N−1) cannot be accepted indefinitely. Therefore, the WDT having priority level (N−1) times out to make an interrupt request having higher priority level N. The interrupt request having priority level N cannot also be accepted indefinitely. Therefore, the WDT having priority level N times out to make an interrupt request having higher priority level (N+1). Since this interrupt request having priority level (N+1) is accepted, the abnormality of the interrupt processing is detected.

Even when an (new) interrupt request having priority level N is the beginning, since the WDT having priority level N times out, an abnormality is detected in the same manner as in (1) mentioned above.

Example 3

When interrupt processing having low priority level N is not executed because of a large number of interrupt requests compared with the processing capability of the CPU though each individual interrupt processing is processed normally (abnormal operation).

Since the interrupt request having priority level N is not accepted, the WDT times out, and the interrupt request having priority level (N+1) is made. After that, this example operates the same way as in the above examples to detect an abnormality.

Example 4

When all interrupts are disabled for a long period of time during interrupt processing (abnormal operation).

A WDT having any priority level times out to make interrupt requests having higher priority levels sequentially. Ultimately, the highest WDT times out to reset the system in order to detect an abnormality. Even when an interrupt is permitted before the system is reset, an abnormality is detected by an interrupt corresponding to a WDT that is the highest at the time.

The illustrative embodiments of the present invention have been described with reference to the accompanying drawings. However, the present invention is not limited to the embodiment. The present invention can be carried out in forms to which various improvements, corrections, and modifications are added based on the knowledge of those skilled in the art without departing from the purpose of the present invention.

The invention claimed is:

1. A method, in a data processing system, of detecting an abnormal operation caused by interrupt processing in a multiple-interrupt system, comprising:
    preparing a plurality of watchdog timers (WDTs), wherein each WDT has a predetermined time-out value for a respective interrupt priority;
    starting a given WDT responsive to an interrupt request having a corresponding priority;
    responsive to detecting the given WDT has timed out, accepting an interrupt request having a priority one or more levels higher than a given interrupt priority corresponding to the given WDT; and
    responsive to determining a cause of interrupt is assigned to the given interrupt priority, giving priority to a lower level interrupt request caused by a timeout of a WDT having an interrupt priority one level lower than the given interrupt priority to detect that an abnormal operation has occurred in processing the lower level interrupt request.

2. The method according to claim 1, further comprising:
    responsive to a first interrupt request of the cause of interrupt, starting a WDT corresponding to the first interrupt request.

3. The method according to claim 1, further comprising resetting each of the plurality of WDTs responsive to a corresponding interrupt request being accepted and interrupt processing being started by a processor.

4. The method according to claim 1, wherein accepting the interrupt request comprises accepting a plurality of interrupt requests having priorities one or more levels higher than the given interrupt priority.

5. The method according to claim 1, further comprising resetting the data processing system responsive to a WDT corresponding to an interrupt whose priority is highest has timed out.

6. The method according to claim 1, further comprising outputting, to a processor, an interrupt request signal having a priority one or more levels higher than the given interrupt priority corresponding to the given WDT.

7. The method according to claim 6, further comprising suppressing output of any other interrupt request signal having a priority level less than or equal to a corresponding priority upon outputting the interrupt request signal.

8. The method according to claim 1, wherein the predetermined timeout value of the given WDT is greater than the predetermined timeout value of a WDT having an interrupt priority lower than the interrupt priority of the given WDT.

9. The method according to claim 1, wherein the predetermined timeout value of the given WDT is less than the predetermined timeout value of a WDT having an interrupt priority higher than the interrupt priority of the given WDT.

10. The method according to claim 1, further comprising:
    responsive to detecting the given WDT has timed out, asserting an interrupt request signal corresponding to a higher level interrupt priority.

11. The method of claim 10, further comprising:
    responsive to asserting the interrupt request signal corresponding to the higher level interrupt priority, starting a WDT corresponding to the higher level interrupt priority.

12. A controller, in a data processing system, for controlling interrupt processing in a multiple-interrupt system, comprising:
    a plurality of watchdog timers (WDTs) each having a predetermined time-out value provided for a respective interrupt priority;
    an interrupt priority selector for receiving an interrupt request signal from a device and outputting an activation signal to a corresponding one of the plurality of WDTs according to the priority of each interrupt request signal; and
    an interrupt processing circuit which, responsive to detecting a given WDT has timed out, outputs, to a processor, an interrupt request signal having a priority one or more levels higher than a given interrupt priority corresponding to the given WDT,
    wherein responsive to determining a cause of interrupt is assigned to the given interrupt priority, the interrupt processing circuit gives priority to a lower level interrupt request signal caused by a timeout of a WDT having an interrupt priority one level lower than the given interrupt priority to detect that an abnormal operation has occurred in processing the lower level interrupt request.

13. The controller according to claim 12, wherein the interrupt processing circuit suppresses output of any other interrupt request signal having a priority level less than or equal to a corresponding priority upon outputting the interrupt request signal.

14. The controller according to claim 12, wherein each of the plurality of WDTs is reset responsive to a corresponding interrupt request being accepted and interrupt processing being started by the processor.

15. The controller according to claim 12, wherein responsive to detecting a WDT having a highest interrupt priority has timed out, the WDT having the highest priority outputs a signal for resetting the system.

16. The controller according to claim 12, wherein responsive to a first interrupt request of the cause of interrupt, the interrupt processing circuit starts a WDT corresponding to the first interrupt request.

17. The controller according to claim 12, wherein accepting the interrupt request comprises accepting a plurality of interrupt requests having priorities one or more levels higher than the given interrupt priority.

18. The controller according to claim 12, wherein the predetermined timeout value of the given WDT is greater than the predetermined timeout value of a WDT having an interrupt priority lower than the interrupt priority of the given WDT.

19. The controller according to claim 12, wherein the predetermined timeout value of the given WDT is less than the predetermined timeout value of a WDT having an interrupt priority higher than the interrupt priority of the given WDT.

20. The controller according to claim 12, wherein responsive to the given WDT timing out, the given WDT asserts an interrupt request signal corresponding to a higher level interrupt priority;
    wherein responsive to assertion of the higher level interrupt priority, a WDT corresponding to the higher level interrupt priority starts.

* * * * *